Figure 1:
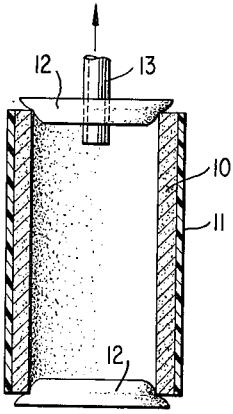

Nov. 30, 1965    L. J. WELLS    3,221,086
PROCESS FOR APPLYING A SUEDE FINISH TO PLASTIC SHEETING
Filed Dec. 30, 1960

INVENTOR.
LOWELL J. WELLS
BY W.A. Schaich
Charles S. Lynch
ATTORNEYS

United States Patent Office 3,221,086
Patented Nov. 30, 1965

3,221,086
PROCESS FOR APPLYING A SUEDE FINISH
TO PLASTIC SHEETING
Lowell J. Wells, Toledo, Ohio, assignor to Owens-Illinois
Glass Company, a corporation of Ohio
Filed Dec. 30, 1960, Ser. No. 79,605
3 Claims. (Cl. 264—90)

This invention relates to a method for producing a suede finish on plastic sheets and films and plastic-coated paper, foil, cloth, and the like, and, more particularly, to a method for producing a suede finish on plastic-coated articles such as bottles, jars, tumblers, and the like.

With the ever-increasing use of different plastics in the form of sheets and films or as coatings for different articles, and particularly the use of plastics as inexpensive substitutes for leather products, many processes have been evolved for treating the plastic to simulate leather finishes thereon. One such type of finish is a suede finish on the surface of the plastic.

In making suede leather, the skin is first treated with tannic acid or formaldehyde and the flesh side of the skin is rubbed to a nap on an emery wheel. It is known that to obtain a suede finish on a plastic sheet, film, or coating, the surface of the plastic, while still in a molten or softened condition, is "flocked," i.e. sprinkled with a thin coating of a granular salt which is embedded into the surface of the plastic and the plastic either fused or chilled to hold the embedded granules. When the hardened plastic surface is washed or leached with water or other suitable salt solvents, a plurality of minute pockets remain on the surface of the plastic, giving the surface a suede appearance and feel.

If attempts are made to provide a suede finish on a plastic film surface by mechanical abrasion, such as by grit-blasting, the plastic film is mechanically weakened, and the resultant surface, while of reduced specular reflection as compared to the original plastic film, still does not have a true suede feel and appearance.

The many advantages of plastics over leather, such as high abrasion resistance, dirt resistance, being more readily cleaned, etc., are well known, and no purpose is served in listing them.

Accordingly, it is an object of this invention to obviate the disadvantages existing in known processes for providing a suede finish or appearance to a plastic sheet, film, or coating.

Another object of this invention is to provide a process for imparting a suede finish on a plastic base, such as film, sheet or coating, simultaneously with the formation of the plastic base.

Still another object of this invention is to provide a process for rapidly forming a suede appearance on a plastic surface without adding to the cost of the plastic and without using materials such as granular salt followed by a leaching step, or without providing additional steps such as mechanically abrading the surface and then cleaning the abraded surface, all of which steps are time-consuming and increase the cost of the final product.

A further object of this invention is to provide a plastic-coated article, including bottles, jars, tumblers, and the like, with a suede feel and appearance on the surface thereof.

In attaining the objects of the invention, one feature resides in coating or forming a sheet or film onto a minutely porous surface, hardening the film on the porous surface and then stripping the film therefrom, the surface of the film adjacent the porous surface having a suede appearance and feel, due to the plurality of minute pockets or indentations therein, corresponding to the minute projections of the porous surface.

Another feature resides in having a pressure differential between the opposite sides of the plastic sheet on the porous surface, with the lower pressure being on the side of the cast sheet in contact with the porous surface, so as to enable the plastic to more readily penetrate the pores and thus provide a plastic surface which, when stripped from the porous surface, is patterned substantially identically to and is, in fact, complementary to the porous surface and thus has an excellent suede feel and appearance.

Still another feature resides in making a tubular, flexible plastic cylinder having a suede surface thereon, and placing the cylinder about the outer periphery of an article such as a bottle.

Other objects, features, and advantages of the invention will be obvious from the following description and drawing thereof.

It has been found that by casting or forming a plastic sheet or film onto a porous surface, such as a sintered, powdered, bronze surface, or a porous ceramic surface, or the like the side of the sheet of film in contact with the porous surface attains a soft suede appearance and feel.

As illustrated in FIG. 1 of the drawing, a sintered powdered bronze cylinder 10 is stoppered by rubber members 12 at each end, and has tube 13 attached to a vacuum pump at the other end (not shown). This cylinder is dipped into a polyvinyl chloride plastisol bath (not shown) and slowly withdrawn, and the film formed thereon is fused by means of infrared heat. When the polyvinyl chloride coating is stripped from the cylinder, a uniform suede feel and appearance are obtained on the surface of the film which has been in contact with the porous metal. By having the pressure within the cylinder lower than the outside pressure, the molten plastisol is better able to penetrate the pores of the surface of the cylinder and take on the true configuration of the porous, sintered surface and be complementary thereto.

The sintered bronze cylinder 10 is immersed only a few seconds in the polyvinyl chloride plastisol at room temperature, the dependent factor being the speed of withdrawal, i.e. 4–6 inches per minute, which permits a smooth, sag-free film 11 to form. Preheating the cylinder, varying the time and temperature, as well as the time immersed, permits production of coatings of varying thicknesses. For example, at room temperature with the aforesaid slow withdrawal a film thickness of 0.013–0.015 inch has been obtained. Preheating the cylinder 30 seconds by rotating it in front of a gas, infrared radiant burner at a distance of 1″ prior to immersing the cylinder in the polyvinyl chloride plastisol for a period of ten seconds provided film thicknesses of from 0.03–0.04 inch. Again, the aforesaid slow withdrawal was used.

Figure 2:
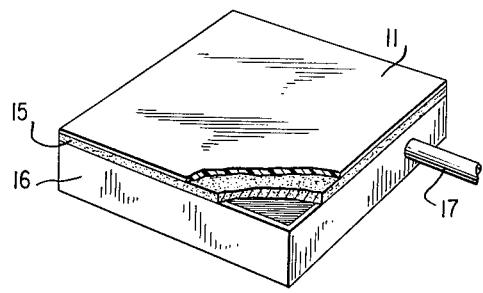

Instead of forming the plastic film on a porous cylinder 10, the film can be sprayed or coated upon a flat porous sintered bronze surface 15 as illustrated in FIG. 2, which surface 15 may be formed above a vacuum chamber 16, whereby the atmosphere within the chamber 16 is reduced by applying suction to tube 17.

The size of the sheet, film, or coating is determined by the size of the porous bronze surface and this, in turn, is limited only by the size and shape of the preparatory mold. The sintered bronze can be heated electrically to continuously fuse a coating, such as plastisol, which has been applied by doctor blade, or simply by rotating the roller through a pool of material which would then be gelled onto the bronze surface by proper control of temperature, speed of rotation, and gel rate of the plastisol to an optimum sheet thickness.

Other methods for applying such coatings or forming such sheets and films are described on pages 943 and 944 of the 1960 edition of Modern Plastics Encyclopedia. Equipment for coating by extrusion, casting, kiss-roll coating, reverse roll coating and the like are illustrated, and to obtain the suede appearance and feel on the plastic surfaces, sintered bronze rollers can be substituted for those causing fusion of plastics, such as plastisols, or the chilling of thermoplastics in the molten state.

While it is preferred to use sintered, powdered bronze for the porous surface, other metals, alloys, oxides of metals and ceramics capable of being sintered or cast into shapes and providing interconnected porosity so that a vacuum can be employed through the porous system, will function as surfaces for casting plastic materials thereon.

The minimum and maximum sizes for the pores of the sintered surface are critical. Thus, the minimum size of the pores is that when the pores can be easily plugged by the coating applied due to loss of cohesion of the fused plastic when stripped from the sintered surface. The maximum size is when the plastic in its liquid state can actually flow through the pores by gravity or be sucked through by vacuum, again causing rupture of the film within the confines of the sintered surface upon stripping. Thus, the maximum and minimum pore size may be governed to some extent by the particular plastic whose surface is to be treated to produce a suede appearance. The plastic surface has the same contour as the porous surface. Tests have shown that polyvinyl chloride plastisols strip cleanly from sintered, powdered bronze cylinders and sheets formed from bronze powder of from about 75 to 300 mesh (A.S.T.M. standard mesh size). For example, when 150 mesh bronze powder is utilized, a surface having the feel and appearance of fine suede is obtained. Thus, the pore size could not exceed the size of the largest particle, and would generally be much smaller, especially if finer particles were included between the voids of the particles designated by the mesh size. Thus, the size of the pores may be from about 75 to 300 mesh and, since the size of the particles around the pores is also from about 75 to 300 mesh, the cavities formed in the film surface will be approximately of the same size. When the porous surface is of fine mesh size, a vacuum should be applied thereto to effect a good contact between the soft film surface and the porous surface and to form an excellent complementary film surface which has the soft feel and appearance of suede.

Figure 5:
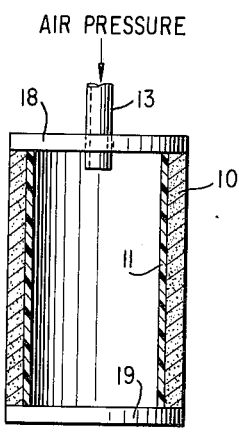

As for the vacuum applied to the apparatus of FIG. 1 or 2, it is not necessary that the degree of vacuum be large, since it is necessary only that the vacuum be just slightly below atmospheric pressure, so as to insure the plastic's flowing into the surface pores of the sintered bronze cylinder. When the plastic is cast on the inside of a cylinder, as shown in FIG. 5, it is necessary only for the pressure within the cylinder to be slightly in excess of the pressure outside of the cylinder to insure the formation of a satisfactory suede finish on the exterior of the plastic. Also, it will be obvious to those in the art that instead of applying a vacuum to the inner chambers of the apparatus illustrated in FIGS. 1 and 2, a positive pressure can be applied to the outside of the cast film before it is fused to insure a surface on the plastic complementary to the surface on the apparatus.

When decorative effects are desired, a decorative pattern may be blocked out on the porous surface, as is done in embossing techniques, and the resultant plastic surface will have a suede feel and appearance except for those portions in contact with the blocked out portion of the porous surface, which will be smooth and glossy in contrast.

When reference is made to plastics in this specification, the term includes thermoplastics and plasticized thermosets generally used for production of continuous flexible sheeting. Included in this term are polyethylene, polypropylene and the vinyls such as polyvinyl chloride (plasticized), polyvinylidene chloride, polyvinyl acetate and polyvinyl alcohol and copolymers of these materials, which are preferred since they are flexible and reformable through heating. When thermoplastics such as polyethylene are utilized, they are first cast upon a sintered, powdered bronze surface and, when the polyethylene is chilled and hardened and then stripped from the surface, the complementary surface of the polyethylene has a suede appearance and feel. When a plastisol, organosol or plastigel is utilized, it is necessary only to fuse the cast product and then cool it and, when stripped from the surface, the complementary surface of the plastic has a suede appearance and feel.

Thus, the process of the present invention is applicable to plastics which are capable of being formed in continuous sheets, which are flexible and even resilient to a certain extent. A typical example of such a plastic is a vinyl plastisol, i.e. a polymer of a monomeric material wherein each constituent contains a single olefinic double bond and in which the predominant monomer is a haloethylene having from one to two halogen atoms, such as chlorine, fluorine, or bromine, on only one carbon atom. The most common example is a polyvinyl chloride plastisol composition, which is readily and commercially available from a number of producers. While plastisols are preferred, organosols may also be used, except that care must be taken to remove the organic solvent during the heating step. Plastigels also may be used as well as other plasticized calenderable mixtures.

The polymeric material used with the present invention includes all of the haloethylene polymers composed predominantly of a polymerized haloethylene having from 1 to 2 halogen atoms, such as chlorine, bromine, and fluorine atoms attached to only one of the carbon atoms. These include homopolymers of vinyl chloride, vinyl bromide, vinyl fluoride, vinylidene chloride, vinylidene bromide, vinylidene fluoride, and interpolymers and copolymers of two or more of these monomers. Monoolefinic materials which can be co- or interpolymerized with the haloethylene monomers include vinyl esters such as vinyl acetate, vinyl propionate, vinyl butyrate, vinyl chloroacetate, vinyl chloropropionate, vinyl benzoate, vinyl chlorobenzoate, and others; acrylic and alpha-alkyl acrylic acids, their alkyl esters, their amides and their nitriles, such as acrylic acid, chloroacrylic acid, methacrylic acid, ethacrylic acid, methyl acrylate, ethyl acrlate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; vinyl aromatic compounds such as styrene, dischlorostyrene, vinyl naphthalene, and others; alkyl esters of maleic and fumaric acids such as dimethyl maleate, diethyl maleate, etc., vinyl alkyl ethers and ketones, and other monoolefinic materials such as vinyl pyridine, N-vinyl carbazole, N-vinyl pyrrolidone, isobutylene, ethylene, trichloroethylene, and various other readily polymerizable compounds containing a single olefinic double bond, especially the $CH=C<$ group.

When utilizing interpolymers or copolymers, the proportions of the various monomers in the monomeric mixtures polymerized to give the interpolymer may be varied considerably, but the haloethylene monomer should constitute at least 50% by weight of the total. Blends or mixtures of the foregoing homopolymers, copolymers and interpolymers can also be used. Where the polymer is to be calendered, it may be in the form of granules, pellets, or powder prior to mixing with the plasticizer in the Banbury or other suitable mixers, and the like. However, when making plastisols, plastigels, or organosols, the polymers should be in the form of powder, and may be porous.

Suitable plasticizers for the haloethylene-containing polymers are diisooctyl phthalate, butyl ethylhexyl phthalate, di-n-octyl phthalate, dioctyl adipate, dioctyl azelate, amyl isodecyl phthalate, butyl isodecyl phthalate, butyl octyl phthalate, dimethylisobutylcarbinyl phthalate, diamyl phthalate, dibutyl phthalate, triethyl phosphate, tri-2-ethylhexyl phosphate, tributoxyethyl phosphate, triphenyl phosphate, tricresyl phosphate, cresylidiphenyl phosphate, octyldiphenyl phosphate, diphenyl mono-o-xenyl phosphate, tris(2-chloroethyl)phosphite, trichloro ethyl phosphate. Other plasticizers which are compatible and suitable for use with the plastisols, organosols, and plastigels are known to those in the art, and can be substituted for any of the aforementioned plasticizers. The amount of plasticizer is that required to give the desired flexibility to the polymer and will vary, depending upon the type of plasticizer and the particular plastic and use thereof.

While unpigmented plastics may be given a suede finish by the process of the invention, the plastisol, organosol, plastigel, thermoplastic, and the like materials may contain pigments, stabilizers, fillers, and the like.

The following will illustrate an embodiment of my invention to those in the art, but the invention is not in any way limited thereby.

A sintered bronze porous cylinder formed from 150-mesh bronze powder was immersed for a few seconds in an unpigmented plastisol resin dispersion consisting of 60 parts by weight of polyvinyl chloride resin (Exon 654) and 40 parts by weight of a plasticizer therefor consisting of a mixture of di-isooctyl phthalate and butyl ethylhexyl phthalate. About 2 parts by weight of a liquid cadmium-barium stabilizer system for the plastisol was also present in the dispersion. The pressure within the cylinder was slightly less than the exterior pressure, due to suction applied therein. The cylinder was slowly withdrawn at the rate of from 4–6 inches per minute and a smooth, sag-free plastisol film was formed thereon of a thickness of about 0.013 inch. The film was fused by rotating the cylinder between two opposing gas radiant burners spaced about 3 inches from the cylinder wall for less than 1 minute. When the film was removed from the porous cylinder, the surface of the film which had been formed on the cylinder had the soft feel and appearance of true suede, and its specular reflectance was greatly reduced in comparison with another film produced in the same manner from the same dispersion but formed on a smooth surface (no suction could be applied to the latter).

When another film from the same dispersion was formed on a flat sintered bronze surface made from 100-mesh bronze powder, and fused by infrared heat without the application of any vacuum to the undersurface of the pores, the plastic, when stripped from the bronze, had a good suede feel and appearance, and it appears that the plastisol dispersion will penetrate the surface pores of the sintered powdered bronze mass by gravity to form a plastic surface complementary to the bronze surface. However, when pore sizes of fine mesh powder are involved, it is preferred to apply a slight vacuum to insure the best suede feel and appearance on the plastic surface comparable to true suede.

Exon 654 is a high molecular weight, stir-in type polyvinyl chloride plastisol made and sold by the Firestone Plastics Company, Pottstown, Pennsylvania, and further described in their brochure "The Use of Exon Dispersion Resins in Plastisols and Organosols."

The liquid-barium-cadmium stabilizer system referred to in the above example is based upon barium phenate, usually in combination with a cadmium soap, such as octoate or other suitable phosphite additive. The phenates are more compatible than barium-cadmium soaps and are particularly useful with sensitive pigments such as lithol rubine reds to overcome color shifting.

Organic lead stabilizers can also be used in polyvinyl chloride plastisols and the varieties run from litharge to dibasic lead phosphate. Lead stearate and dibasic lead stearate are fair heat stabilizers, and have good lubricating properties. Other stabilizers are disclosed on pages 16 and 17 of the aforementioned Exon brochure as are the various pigments which can be used with the plastisols and organosols.

Figure 4:
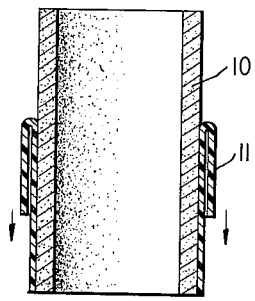
Figure 3:
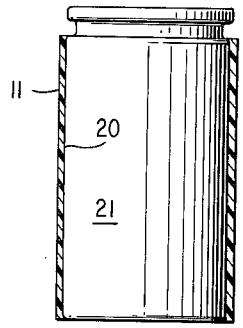

To form a plastic film having a suede finish onto a surface of an article, such as a bottle, the plastic film 11 formed in the manner described above and illustrated in FIG. 1, is stripped from the sintered bronze cylinder 10 in the manner shown in FIG. 4, and since the film is flexible and resilient to some extent, it can be slipped onto the outer surface 20 of the bottle 21.

In another embodiment, the film is formed in the interior of a sintered, powdered bronze cylinder, as by slush or roll coating and, as shown in FIG. 5, a slight air pressure is applied by means of tube 13 into the interior of the cylinder which is closed by members 18 and 19. Thus, the film is forced into good contact with the pores of the inner cylinder surface and is fused thereon. When members 18, 19 are removed from the cylinder 10, the film is stripped from the interior of the cylinder. Since the suede finish is on the outside of the film, there is no need to turn the film inside out, as illustrated in FIG. 4. Again, the film being flexible and resilient, it can be readily placed over the exterior of a bottle.

Thus, by forming the film of the particular size and configuration of the article to be covered thereby, and because of its flexibility and resilience, the film may be readily placed about the article and the article thereby coated with a plastic having a suede appearance and feel. A suitable adhesive secures the film to the surface of the article. If necessary, the bond may be effected by post-heating the coating article below the temperature required for distorting the suede-surfaced thermoplastic.

Films made in accordance with the foregoing invention have a multitude of uses such as exterior coverings for shoes, plastic coated bottles, jars, tumblers and the like where a suede feel and appearance are desired, for example in cosmetic containers; as suede plastic automobile seat covers particularly since many of the suitable plastics, such as the vinyls, are abrasion-resistant; wrappings; and the like.

Having fully described the invention, what is claimed is:

1. A process of forming a container having a flexible, resilient thermoplastic coating thereon, the exterior surface of said coating having a suede feel and appearance, comprising the steps of forming a plastic film on the porous surface of a mold made by sintering metallic particles having a size of 75 to 300 mesh, said porous surface having a plurality of minute indentations and projections thereon, providing a fluid pressure differential between the surface of the thermoplastic film in contact with said porous surface and the other side of said film, said pressure differential being sufficient to cause the film to flow into the pores of said porous surface so that the surface of the plastic film has formed therein minute projections and indentations corresponding to the pores of said porous surface, hardening said film into a flexible and resilient state, removing said film from contact with said porous surface, said film surface in contact with said porous surface force being complementary to said porous surface and having formed therein the plurality of minute projections and indentations corresponding to the pores in said porous mold surface and thereby having a suede appearance and feel, the pores of said porous surface being large enough not to become plugged by the film due to loss of cohesion when said film is removed from said porous surface and small enough to prevent flow of said film through said pores and consequently rupturing said film when said film is removed from said porous surface, placing said flexible and resilient suede film about said container and securing said film to said container.

2. A process of forming a container having a flexible resilient thermoplastic coating thereon, the exterior surface of said coating having a suede feel and appearance comprising the steps of using a thermoplastic resin plastisol to form a plastic film on the porous surface of a mold, said mold made by sintering metallic particles having a size of 75 to 300 mesh, said porous surface having a plurality of minute indentations and projections thereon, providing a fluid pressure differential between the surface of the thermoplastic film in contact with said porous surface and the other side of said film, said pressure differential being sufficient to cause the film to flow into the pores of said porous surface so that the surface of the plastic film has formed therein minute projections and indentations corresponding to the pores of said porous surface, hardening said film into a flexible and resilient state, removing said film from contact with said porous surface, said film surface in contact with said porous surface being complementary to said porous surface and having formed therein the plurality of minute projections and indentations corresponding to the pores in said porous mold surface and thereby having a suede appearance and feel, the pores of said porous surface being large enough not to become plugged by the film due to loss of cohesion when said film is removed from said porous surface and small enough to prevent flow of said film through said pores and consequently rupturing said film when said film is removed from said porous surface, placing said flexible and resilient suede film about said container and securing said film to said container.

3. A process of forming a container having a flexible resilient thermoplastic coating thereon, the exterior surface of said coating having a suede feel and appearance comprising the steps of using a polyvinyl chloride resin plastisol consisting essentially of 60 parts by weight of a polyvinyl chloride resin and 40 parts by weight of a plasticizer therefor consisting of a mixture of di-isooctyl phthalate and butyl ethylhexyl phthalate and forming therewith a plastic film on a porous cylinder, said porous cylinder being made by sintering metallic particles having size of about 150 mesh, the porous surface of said cylinder having a plurality of minute indentations and projections thereon corresponding in size to the particles of 150 mesh, applying suction within said porous cylinder so as to cause the film to flow into the pores of said porous surface so that the surface of the plastic film has formed therein minute projections and indentations corresponding to the pores of said porous surface, hardening said film into a flexible and resilient state, removing said film from contact with said porous surface, placing said flexible and resilient suede film about said container and securing said film to said container so that the surface of the film previously contacting the surface of the porous cylinder is the exterior surface.

References Cited by the Examiner
UNITED STATES PATENTS

| | | | |
|---|---|---|---|
| 1,983,667 | 12/1934 | L'Hollier | 18—58.4 |
| 2,124,871 | 7/1938 | Beal | 18—58.4 |
| 2,317,447 | 4/1943 | Domizi | 18—57 |
| 2,345,112 | 3/1944 | Grundel. | |
| 2,354,916 | 8/1944 | Hurt. | |
| 2,377,946 | 6/1945 | Leary. | |
| 2,434,780 | 1/1948 | Wiss et al. | 18—58 |
| 2,474,721 | 6/1949 | Billner. | |
| 2,493,439 | 1/1950 | Braund. | |
| 2,566,982 | 9/1951 | Clemens et al. | 18—57 |
| 2,660,757 | 12/1953 | Smith et al. | |
| 2,733,494 | 2/1956 | Bryer et al. | |
| 2,776,451 | 1/1957 | Chavannes. | |
| 2,776,452 | 1/1957 | Chavannes. | |
| 2,799,048 | 7/1957 | Stirn et al. | |
| 2,913,773 | 11/1959 | Hassell | 18—57 |

ROBERT F. WHITE, *Primary Examiner.*

WILLIAM STEPHENSON, MORRIS SUSSMAN, ALEXANDER H. BRODMERKEL, *Examiners.*